United States Patent
Hsieh et al.

(10) Patent No.: US 10,645,011 B2
(45) Date of Patent: May 5, 2020

(54) NETWORK DEVICE AND CONTROLLING METHOD THEREOF APPLICABLE FOR MESH NETWORKS

(71) Applicant: Arcadyan Technology Corporation, Hsinchu (TW)

(72) Inventors: Tsung-Hsien Hsieh, Hsinchu (TW); Chih-Fang Lee, Hsinchu (TW)

(73) Assignee: ARCADYAN TECHNOLOGY CORPORATION (TW)

( * ) Notice: Subject to any disclaimer, the term of this patent is extended or adjusted under 35 U.S.C. 154(b) by 0 days.

(21) Appl. No.: 16/203,135

(22) Filed: Nov. 28, 2018

(65) Prior Publication Data

US 2019/0190839 A1 Jun. 20, 2019

(30) Foreign Application Priority Data

Dec. 15, 2017 (TW) .............................. 106144270 A

(51) Int. Cl.
*H04L 12/851* (2013.01)
*H04L 12/705* (2013.01)
(Continued)

(52) U.S. Cl.
CPC ...... *H04L 47/2441* (2013.01); *H04L 12/2858* (2013.01); *H04L 12/46* (2013.01); *H04L 41/0816* (2013.01); *H04L 45/02* (2013.01); *H04L 45/18* (2013.01); *H04L 45/26* (2013.01); *H04L 45/54* (2013.01); *H04L 45/70* (2013.01);
(Continued)

(58) Field of Classification Search
None
See application file for complete search history.

(56) References Cited

U.S. PATENT DOCUMENTS 6,118,768 A * 9/2000 Bhatia ................. H04L 12/2856
370/254
2005/0074015 A1 4/2005 Chari et al.
(Continued)

FOREIGN PATENT DOCUMENTS

EP 3499808 A1 6/2019

OTHER PUBLICATIONS

European Search Report, Application No. 18206562.3, dated Mar. 21, 2019, pp. 1-10.

*Primary Examiner* — Hong S Cho
(74) *Attorney, Agent, or Firm* — Innovation Counsel LLP

(57) ABSTRACT

A network device including an Ethernet transmission interface and a processing unit is provided. The Ethernet transmission interface is provided with at least one Ethernet transmission port. The processing unit is coupled to the Ethernet transmission interface and is configured to: in order to detect whether a packet looping exists, send out a dynamic host configuration protocol (DHCP) discover message through a linked Ethernet transmission port in response to linking one of the at least one Ethernet transmission port to a network and determine whether a DHCP offer message is received; determine whether to prohibit data transmission of the linked Ethernet transmission port according to whether the DHCP discover message returned through the packet looping is detected; classify the linked Ethernet transmission port as an uplink transmission port or a downlink transmission port according to whether the DHCP offer message is received.

20 Claims, 6 Drawing Sheets

(51) Int. Cl.
*H04L 29/12* (2006.01)
*H04L 12/28* (2006.01)
*H04L 12/46* (2006.01)
*H04L 12/24* (2006.01)
*H04L 12/751* (2013.01)
*H04L 12/721* (2013.01)
*H04L 12/741* (2013.01)
*H04W 84/22* (2009.01)
*H04L 12/18* (2006.01)

(52) U.S. Cl.
CPC ...... *H04L 61/2015* (2013.01); *H04L 61/2076* (2013.01); *H04L 12/189* (2013.01); *H04W 84/22* (2013.01)

(56) References Cited

U.S. PATENT DOCUMENTS

| | | |
|---|---|---|
| 2007/0115967 A1 | 5/2007 | Vandenberghe et al. |
| 2007/0171814 A1 | 7/2007 | Florit et al. |
| 2011/0119360 A1 | 5/2011 | Kish et al. |
| 2015/0156815 A1 | 6/2015 | Pang et al. |
| 2015/0334085 A1* | 11/2015 | Li .................. H04L 61/2015 709/245 |
| 2016/0218966 A1 | 7/2016 | Higashinakagawa et al. |
| 2019/0190839 A1 | 6/2019 | Hsieh et al. |

* cited by examiner

NETWORK DEVICE AND CONTROLLING METHOD THEREOF APPLICABLE FOR MESH NETWORKS

This application claims the benefit of Taiwan application Serial No. 106144270, filed Dec. 15, 2017, the subject matter of which is incorporated herein by reference.

BACKGROUND OF THE INVENTION

Field of the Invention

The invention relates in general to a network device and a controlling method thereof, and more particularly to a network device and a controlling method thereof applicable for mesh networks.

Description of the Related Art

The mesh network is a widely used wireless network architecture. Being provided with self-configuration and self-organization, the mesh network allows its nodes to be freely linked and can dynamically adjust network topology in response to the change in the linking manner of the nodes.

However, arbitrarily linked nodes of the mesh network may result in the formation of a packet looping, which makes the packet circulate in the looping path. Furthermore, an end user links to an isolated network node will not be able to access network services. Therefore, it has become a prominent task for the industries to provide an effective solution in response to the above problem.

SUMMARY OF THE INVENTION

The invention is directed to a network device and a controlling method thereof. The network device can effectively perform self-detection and stop the formation of packet looping. Furthermore, the network device can determine the uplink/downlink transmission of its Ethernet transmission port, and therefore resolve the instability problem derived when the network device is added to the mesh network or the connection is adjusted.

According to one embodiment of the present invention, a network device is provided. The network device includes an Ethernet transmission interface and a processing unit. The Ethernet transmission interface is provided with at least one Ethernet transmission port. The processing unit is coupled to the Ethernet transmission interface and is configured to: in order to detect whether a packet looping exists, send out a dynamic host configuration protocol (DHCP) discover message through a linked Ethernet transmission port in response to linking one of the at least one Ethernet transmission port to a network and determine whether a DHCP offer message is received; determine whether to prohibit data transmission of the linked Ethernet transmission port according to whether the DHCP discover message returned through the packet looping is detected; classify the linked Ethernet transmission port as an uplink transmission port or a downlink transmission port according to whether the DHCP offer message is received.

According to another embodiment of the present invention, a controlling method of network device is provided. The network device includes an Ethernet transmission interface provided with at least one Ethernet transmission port and a processing unit coupled to the Ethernet transmission interface. The controlling method includes: in order to detect whether a packet looping exists, sending out a DHCP discover message through a linked Ethernet transmission port by the processing unit in response to linking one of the at least one Ethernet transmission port to a network and determining whether a DHCP offer message is received; determining whether to prohibit data transmission of the linked Ethernet transmission port by the processing unit according to whether the DHCP discover message returned through the packet looping is detected; classifying the linked Ethernet transmission port as an uplink transmission port or a downlink transmission port by the processing unit according to whether the DHCP offer message is received.

In an embodiment, the processing unit prohibits data transmission of the linked Ethernet transmission port after detecting the DHCP discover message returned through a packet looping.

In an embodiment, the processing unit classifies the linked Ethernet transmission port as the uplink transmission port after receiving the DHCP offer message.

In an embodiment, the processing unit classifies the linked Ethernet transmission port as the downlink transmission port if the DHCP offer message is not received within a specified time interval.

In an embodiment, the network device further includes a wireless transmission interface coupled to the processing unit which enables downlink transmission of the wireless transmission interface after classifying the linked Ethernet transmission port as the uplink transmission port.

In an embodiment, the processing unit disables downlink transmission of the wireless transmission interface after detecting that the connection between the Ethernet transmission port classified as the uplink transmission port and the network is interrupted.

In an embodiment, the wireless transmission interface of the network device is a Wi-Fi transmission interface.

In an embodiment, the network device is a repeater applicable for mesh networks.

In an embodiment, the Ethernet transmission interface of the network device includes a plurality of Ethernet transmission ports, wherein data stream is respectively provided to the processing unit for processing before being transferred to each Ethernet transmission port.

The above and other aspects of the invention will become better understood with regard to the following detailed description of the preferred but non-limiting embodiment(s). The following description is made with reference to the accompanying drawings.

DETAILED DESCRIPTION OF THE INVENTION

For the technical features of the present invention to be clearly understood, a number of exemplary embodiments are disclosed below with detailed descriptions. However, the exemplary embodiments are for explanatory and exemplary purposes only, not for limiting the scope of protection of the present invention.

Figure 1A:
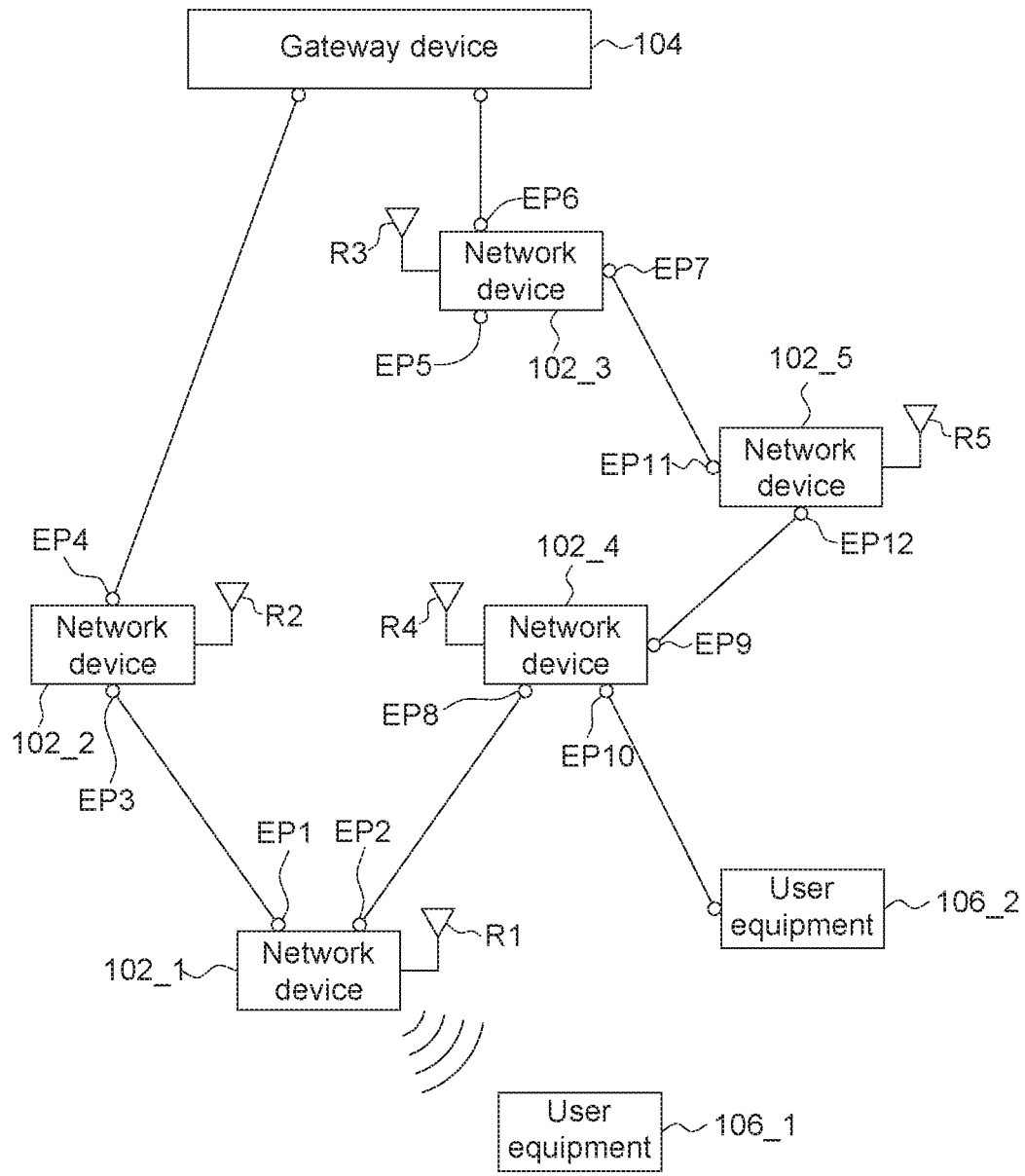
FIG. 1A is a schematic diagram of an example of a mesh network.

Please refer to FIG. 1A; FIG. 1A is a schematic diagram of an example of a mesh network 100. The mesh network 100 includes five network devices 102_1~102_5, a gateway device 104 and two user equipment 106_1 and 106_2. Each of the network devices 102_1~102_5 can be, for example, a repeater. The network devices 102_1~102_5 can be connected by using wired connection and/or wireless connection for receiving and transmitting data streams. The network devices 102_1~102_5 can further be operated in an access point (AP) mode and used as an AP device for providing the user equipment (such as the user equipment 106_1) with Wi-Fi service. The user equipment 106_1 and 106_2 can be, for example, set-top boxes, personal computers, TVs or other terminal devices.

Although in FIG. 1A five network devices, one gateway device and two user equipment are illustrated, the quantity and connection manners of the network devices are not used to limit the present invention. Generally speaking, the quantity and connection manners of the network devices are not subjected to specific restrictions.

In the exemplary embodiment illustrated in FIG. 1A, each of the network devices 102_1~102_5 respectively includes a wired Ethernet transmission interface and a wireless Wi-Fi transmission interface, wherein the Ethernet transmission interface of each of the network devices 102_1~102_5 includes at least one Ethernet transmission port. As indicated in FIG. 1A, the network device 102_1 includes two Ethernet transmission ports EP1 and EP2 and a Wi-Fi transmission interface R1, the network device 102_2 includes two Ethernet transmission ports EP3 and EP4 and a Wi-Fi transmission interface R2; the network device 102_3 includes three Ethernet transmission ports EP5, EP6 and EP7 and a Wi-Fi transmission interface R3; the network device 102_4 includes three Ethernet transmission ports EP8, EP9 and EP10 and a Wi-Fi transmission interface R4, and the network device 102_5 includes Ethernet two transmission ports EP11 and EP12 and a Wi-Fi transmission interface R5.

The gateway device 104 can provide the network devices 102_1~102_5 with gateway service, such as access to Internet or connection to other wired/wireless networks.

If the Ethernet transmission port of network device can be directly or indirectly connected to the gateway device 104, the Ethernet transmission port is classified as an uplink transmission port; otherwise, the Ethernet transmission port is classified as a downlink transmission port. For example, the Ethernet transmission port EP1 of the network device 102_1 can be connected to the gateway device 104 through the network device 102_2, hence the Ethernet transmission port EP1 of the network device 102_1 is defined as a uplink transmission port. On the other hand, the Ethernet transmission port EP10 of the network device 102_4 is directly connected to the user equipment 106_2, hence the Ethernet transmission port EP10 is defined as a downlink transmission port.

Figure 1B:
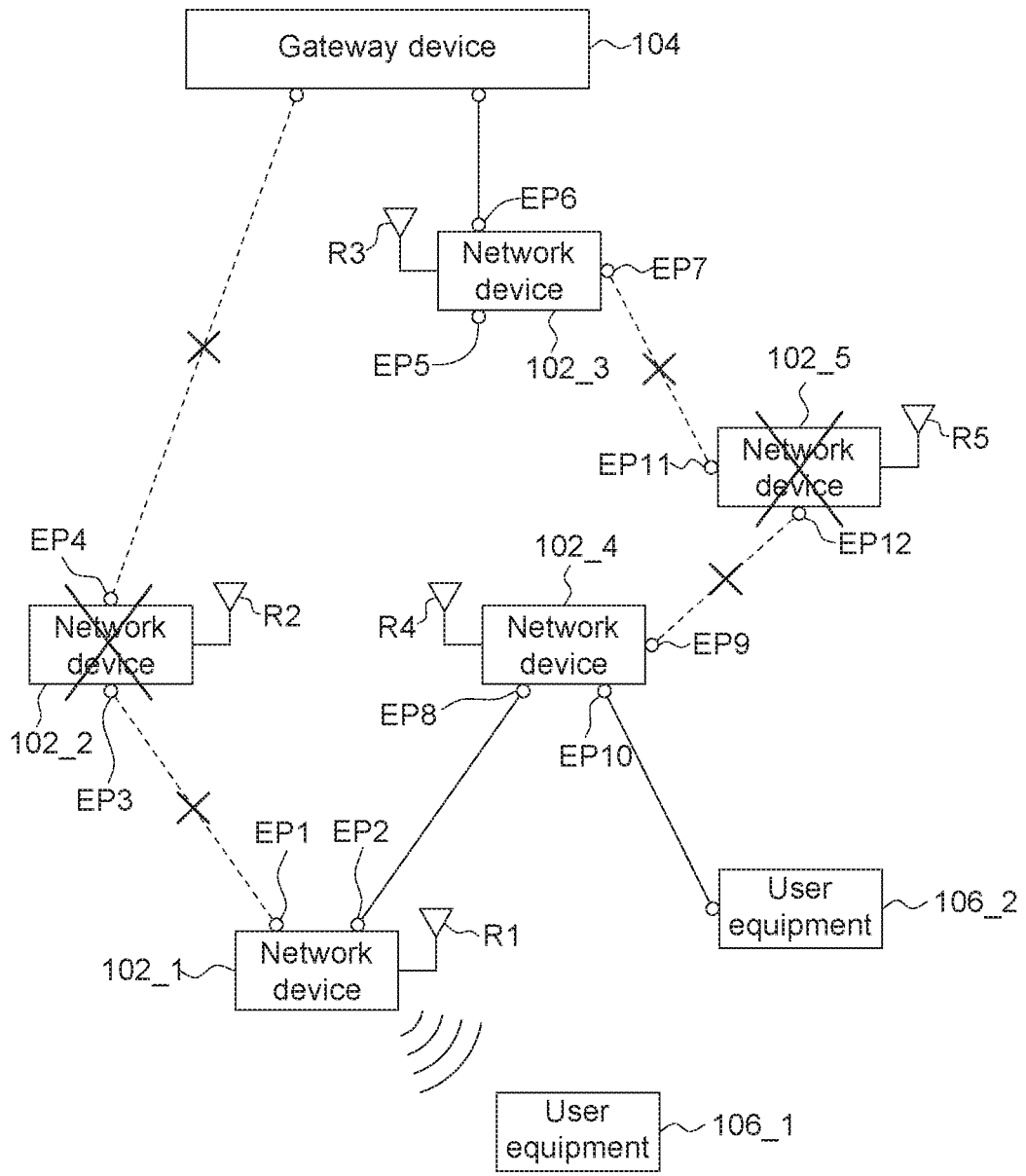
FIG. 1B is a schematic diagram of forming an island network device in a mesh network.
Figure 1C:
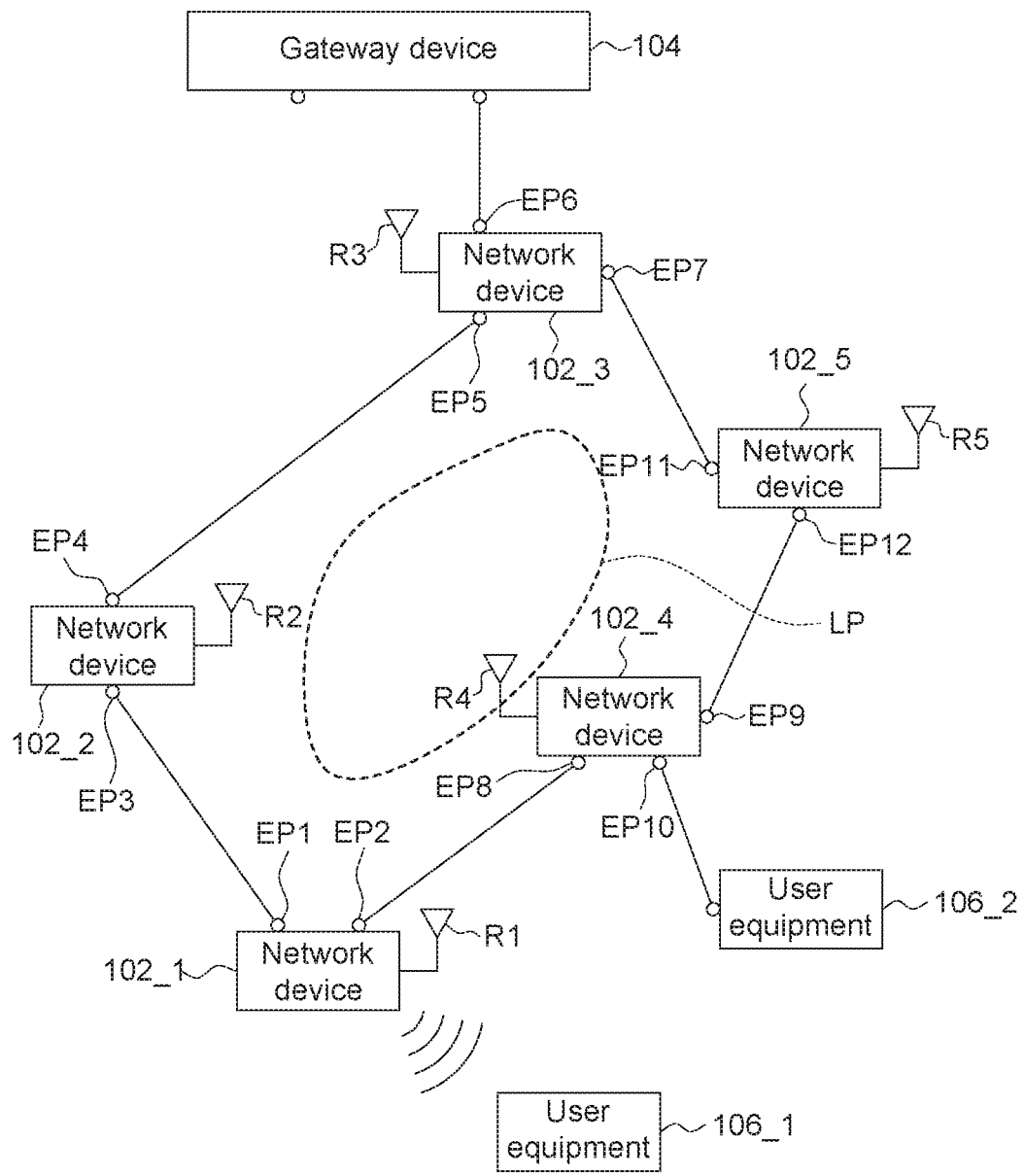
FIG. 1C is a schematic diagram of forming a packet looping in a mesh network.

The mesh network 100 is with a dynamic network structure. The changes in the connection manners of network nodes would normally cause the change of the topology of the overall network. Meanwhile, if the connection state of the node transmission ports is not properly defined or updated, island node or packet looping may be formed in the mesh network 100. Let the network device 102_4 of FIG. 1B be taken as an example. When the network devices 102_2 and 102_5 are out of order, the network device 102_4 cannot be connected to the gateway device 104 and hence will become an island network device, and thus the user equipment 106_2 connected to the network device 102_4 will be unable to be connected to an external network. As indicated in FIG. 1C, when the Ethernet transmission port EP4 of the network device 102_2 changes to be connected to the Ethernet transmission port EP5 of the network device 102_3, a packet looping LP will be formed and resulted in the packet being circulated in the packet looping LP.

To avoid the formation of aforementioned packet looping, when a new network device is physically connected to the mesh network through an Ethernet transmission port, the new network device will check whether the connection of the Ethernet transmission port will result in packet looping, and, will prohibit the connection of the Ethernet transmission port if it determines that the connection of the Ethernet transmission port will be accompanied with the formation of packet looping. Besides, the new network device can further determine whether the Ethernet transmission port belongs to a uplink transmission port or a downlink transmission port. When it determines that the Ethernet transmission port belongs to a uplink transmission port, the network device enters an AP mode and enables downlink transmissions of the wireless transmission interface for providing the user equipment with wireless network service.

Figure 2:
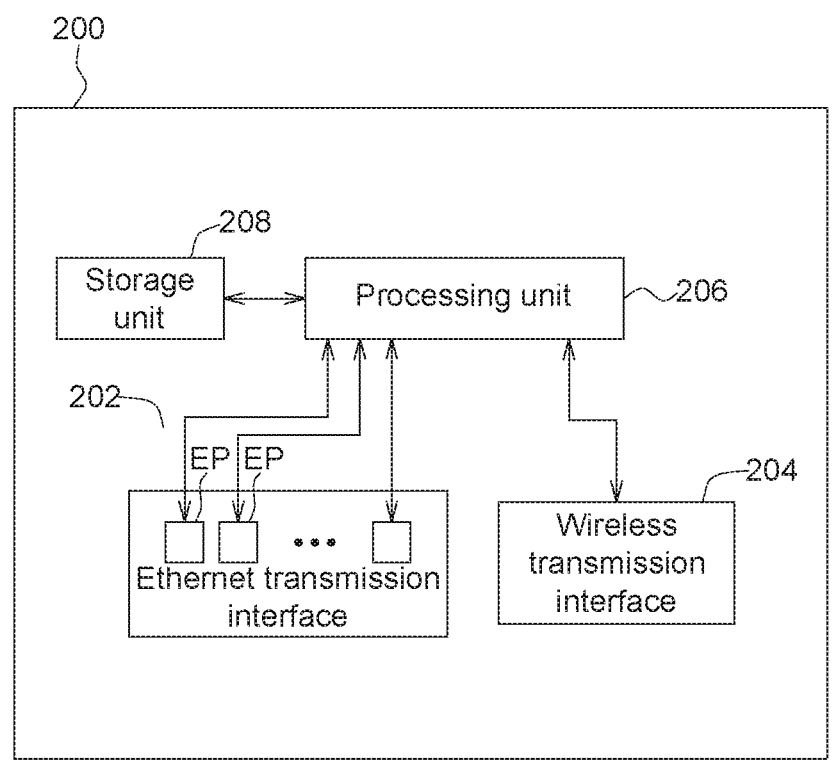
FIG. 2 is a block diagram of network device according to an embodiment of the present invention.

Please refer to FIG. 2; FIG. 2 is a block diagram of network device 200 according to an embodiment of the present invention. The network device 200 can be used as, for example, but not limited to, any of the network devices 102_1~102_5 in FIGS. 1A~1C.

The network device 200 includes an Ethernet transmission interface 202, a wireless transmission interface 204, a processing unit 206 and a storage unit 208. The Ethernet transmission interface 202 includes one or more Ethernet transmission ports EP. Each Ethernet transmission port EP can be connected to an Ethernet cable to form a physical Ethernet connection, through which the network device 200 can be connected to the exterior. The wireless transmission interface 204 can be, for example, a Wi-Fi transmission interface. The processing unit 206 can be, for example, a micro-processor, a micro-controller, a chip, a circuit board or other circuits with computation processing function. The processing unit 206 is electrically connected to an Ethernet transmission interface 202, a wireless transmission interface 204 and a storage unit 208 and the processing unit 206 is configured to process the messages transmitted from the Ethernet transmission interface 202 and from the wireless transmission interface 204, and to implement the network device controlling method of the present invention. The storage unit 208 may, for example, include a memory configured to store the instructions, data and programming codes that can be executed or processed by the processing unit 206.

Different from the architecture of the conventional network device having multiple Ethernet transmission ports, according to an exemplary embodiment of the present invention, when data is received by a particular Ethernet transmission port EP of the network device, the data will firstly be transmitted to the processing unit 206 for processing, instead of being transmitted to other Ethernet transmission port EP via an internal switch. The said data transmission can be implemented through multiple Ethernet media access control addresses or a port-based virtual local area network.

Figure 3:
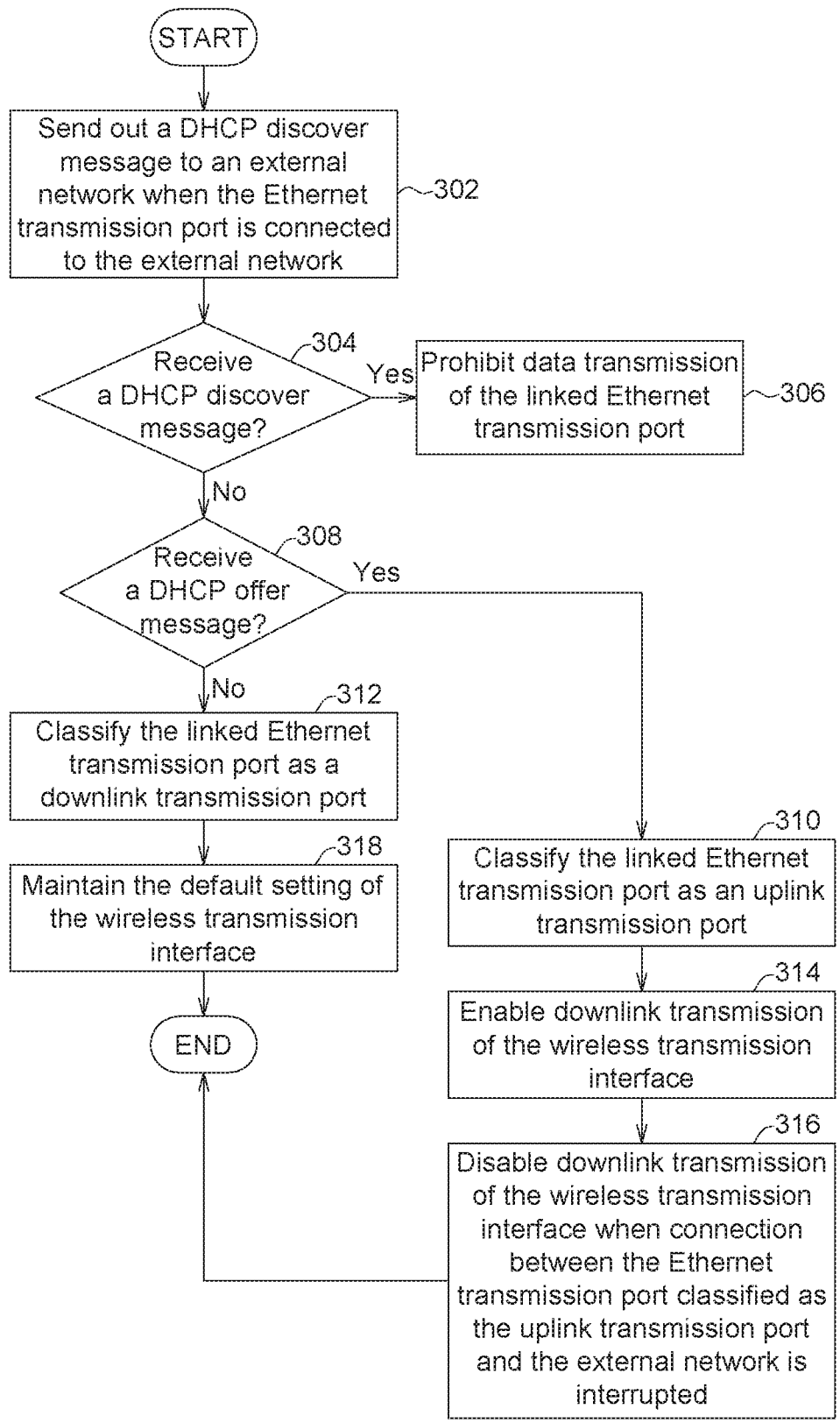
FIG. 3 is a flowchart of a controlling method of network device according to an embodiment of the present invention.

FIG. 3 is a flowchart of a controlling method of network device 200 according to an embodiment of the present invention. In step 302, the processing unit 206 sends out a dynamic host configuration protocol (DHCP) discover message to an external network (e.g., a mesh network) after detecting the Ethernet transmission port EP is connected to the external network.

In step 304, the processing unit 206 determines whether the DHCP discover message is received by the network device 200.

According to the DHCP protocol, the DHCP discover message is a packet broadcasted by the networking device for requesting an IP address. Therefore, if the processing unit 206 receives the DHCP discover message sent by itself, instead of receiving a DHCP offer message, this implies that a packet looping is formed in the network, in this situation the DHCP discover message will be returned to the network device 200 due to the packet looping.

In step 306, if the DHCP discover message returned through a packet looping is detected, the processing unit 206 prohibits data transmission or reception of the linked Ethernet transmission port EP.

In step 308, the processing unit 206 determines whether the DHCP offer message is received by the network device 200. In an example, the processing unit 206 can set a specific timer and determine whether the DHCP offer message is received before time up of the timer. If no DHCP offer message is received within the specified time interval, it can determine that the DHCP offer message is not received by the network device 200.

If the determination result of step 308 is affirmative, this implies that the linked Ethernet transmission port EP can be connected to the gateway device or other network service providing devices through a transmission connection. Then, the method proceeds to step 310, the processing unit 206 classifies the linked Ethernet transmission port EP as an uplink transmission port.

Conversely, if the determination result of step 308 is negative, the method proceeds to step 312, the processing unit 206 classifies the linked Ethernet transmission port EP as a downlink transmission port.

In an example, the processing unit 206 marks the linked Ethernet transmission port EP as an uplink transmission port or a downlink transmission port according to a mapping table recorded in the storage unit 208.

In step 314, after it is determined that the Ethernet transmission port EP is an uplink transmission port, the processing unit 206 enables downlink transmission of the wireless transmission interface 204 to provide the user equipment with wireless network service. Meanwhile, the network device 200 is operated in an AP mode.

In step 316, when the processing unit 206 detects that the connection between the Ethernet transmission port which is classified as the uplink transmission port EP and an external network is interrupted (for example, the processing unit 206 detects that the physical Ethernet cable is unplugged), this implies that the network device 200 may be in an island state, and the processing unit 206 will disable downlink transmission of the wireless transmission interface 204 to avoid the user equipment being connected to the network device 200 which has become an island node.

In step 318, when it is determined that the Ethernet transmission port EP is a downlink transmission port, the processing unit 206 will maintain the default setting of the wireless transmission interface 204. For example, the processing unit 206 maintains disabling downlink transmission of the wireless transmission interface 204.

Figure 4:
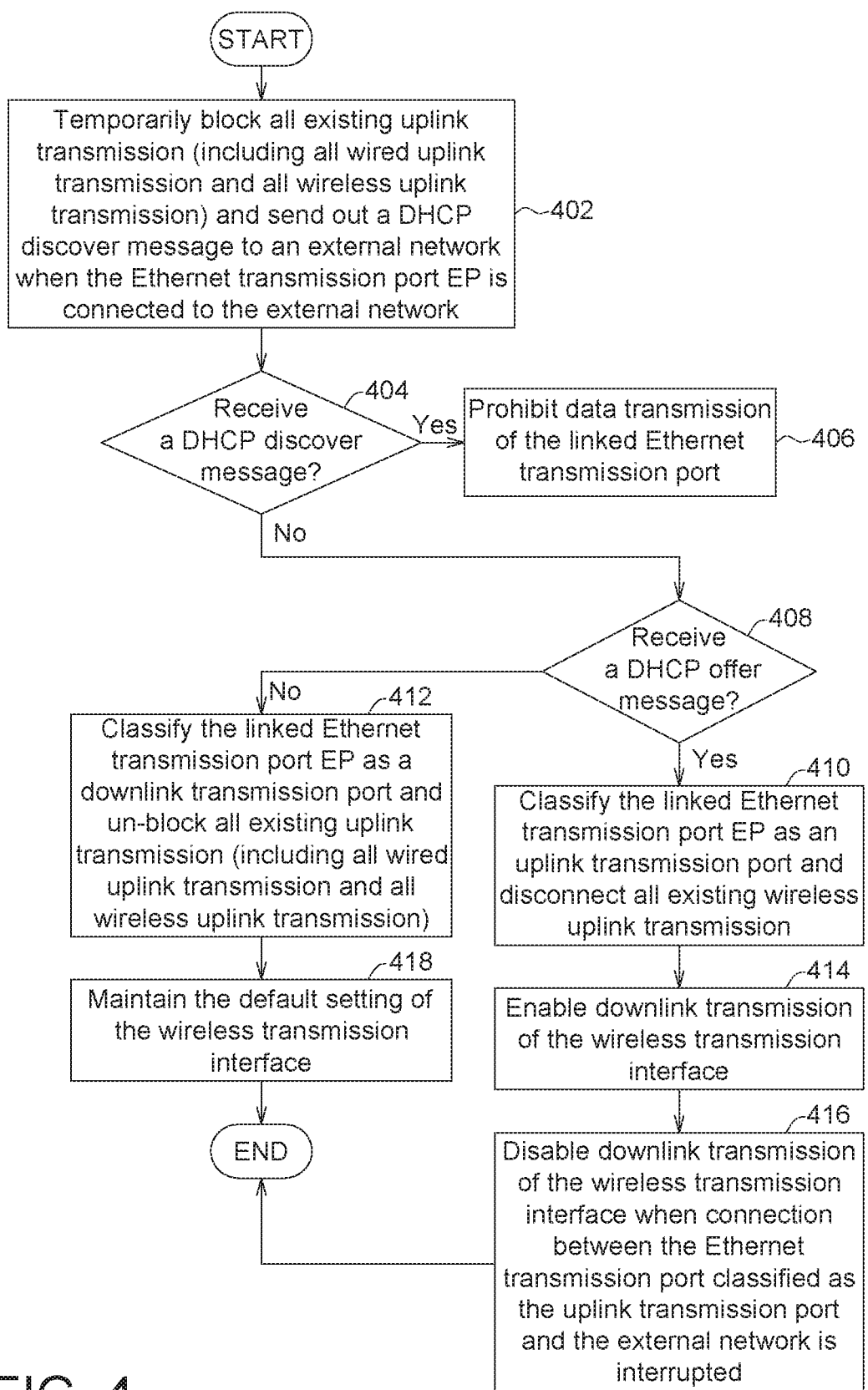
FIG. 4 is a flowchart of a controlling method of network device according to an embodiment of the present invention.

FIG. 4 is a flowchart of a controlling method of the network device 200 according to an embodiment of the present invention. In step 402, the processing unit 206 temporarily blocks all existing uplink transmission (including all existing wired uplink transmission and all existing wireless uplink transmission) and the processing unit 206 sends out a dynamic host configuration protocol (DHCP) discover message to an external network (e.g., a mesh network) after detecting the Ethernet transmission port EP is connected to the external network.

Steps 404, 406 and 408 are the same or similar to steps 304, 306 and 308.

If the determination result of step 308 is affirmative, this implies that the linked Ethernet transmission port EP can be connected to the gateway device or other network service providing devices through a transmission connection. Then, the method proceeds to step 410, the processing unit 206 classifies the linked Ethernet transmission port EP as an uplink transmission port and disconnects all existing wireless uplink transmission.

Conversely, if the determination result of step 408 is negative, the method proceeds to step 412, the processing unit 206 classifies the linked Ethernet transmission port EP as a downlink transmission port and un-blocks all existing uplink transmission (including all existing wired uplink transmission and all existing wireless uplink transmission).

In an example, the processing unit 206 marks the linked Ethernet transmission port EP as an uplink transmission port or a downlink transmission port according to a mapping table recorded in the storage unit 208.

Steps 414, 416 and 418 are the same or similar to steps 314, 316 and 318.

Thus, the controlling method of the network device 200 in FIG. 4 may effectively detect the packet looping by detecting whether a DHCP discover message is received.

As disclosed above, the network device and the controlling method thereof of the present invention can effectively perform self-detection and avoid the formation of packet looping. Furthermore, the network device can determine the uplink/downlink transmission of its Ethernet transmission ports, and therefore resolve the instability problem derived when a new network device is added to the mesh network or when the connection is adjusted.

It can be understood that the DHCP discover message and the DHCP offer message used in above embodiments can also be replaced by other self-defined messages or other messages whose functions are similar or identical to that of the DHCP discover message and the DHCP offer message. Besides, the wireless transmission interface of the network device can be, a Wi-Fi transmission interface, a ZigBee, Bluetooth or other transmission interfaces applicable for wireless local area networks.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A repeater applicable for mesh networks, comprising:
a wireless transmission interface;
at least one wired transmission interface provided with at least one wired transmission port; and
a processing unit, coupled to the wired transmission interface and the wireless transmission interface, configured to:

when one of the wired transmission port is linked to a network, send out a discover message via said wired transmission port;

determine whether a packet looping exists by whether said discover message returns through the transmission interface other than said wired transmission port;

determine whether to prohibit data transmission of said wired transmission port; and classify said wired transmission port as an uplink transmission port or a downlink transmission port according to whether an offer message is received by said wired transmission port, wherein said offer message is sent by a gateway device in response to receiving said discover message.

2. The repeater according to claim 1, wherein the processing unit is further configured to:

prohibit data transmission of said wired transmission port, which sends out the discover message, after detecting the discover message returned through the packet looping.

3. The repeater according to claim 1, wherein the processing unit is further configured to:

classify said wired transmission port, which sends out the discover message, as the uplink transmission port after receiving the offer message; and classify said wired transmission port, which sends out the discover message, as the downlink transmission port if the offer message is not received within a specified time interval.

4. The repeater according to claim 1, wherein the processing unit is further configured to enable a downlink transmission of the wireless transmission interface after classifying said wired transmission port as the uplink transmission port.

5. The repeater according to claim 4, wherein the processing unit is further configured to:

disable the downlink transmission of the wireless transmission interface after detecting that connection between said wired transmission port classified as the uplink transmission port and the network is interrupted.

6. The repeater according to claim 4, wherein the wireless transmission interface is a Wi-Fi transmission interface, the wired transmission interface is an Ethernet transmission interface, the wired transmission port is an Ethernet transmission port, the discover message is a dynamic host configuration protocol (DHCP) discover message, and the offer message is a DHCP offer message.

7. The repeater according to claim 1, wherein the number of the at least one wired transmission port is plural, and data stream is respectively provided to the processing unit for processing before being transferred to each of the wired transmission port.

8. The repeater according to claim 1, wherein the processing unit is further configured to:

temporarily block all existing uplink transmission before sending out the discover message;

classify said wired transmission port, which sends out the discover message, as the uplink transmission port and disconnect all existing wireless uplink transmission after receiving the offer message; and classify said wired transmission port, which sends out the discover message, as the downlink transmission port and un-block all existing uplink transmission if the offer message is not received within a specified time interval.

9. A controlling method of a network device, the network device comprising an Ethernet transmission interface provided with at least one Ethernet transmission port and a processing unit coupled to the Ethernet transmission interface, the controlling method comprising:

sending out a dynamic host configuration protocol (DHCP) discover message through a linked Ethernet transmission port by the processing unit in response to linking one of the at least one Ethernet transmission port to a network and determining whether a DHCP offer message is received;

determining whether to prohibit data transmission of the linked Ethernet transmission port by the processing unit according to whether the DHCP discover message returned through a packet looping is detected; and classifying the linked Ethernet transmission port as an uplink transmission port or a downlink transmission port by the processing unit according to whether the DHCP offer message is received.

10. The controlling method according to claim 9, further comprising:

prohibiting data transmission of the linked Ethernet transmission port by the processing unit after detecting the DHCP discover message returned through the packet looping.

11. The controlling method according to claim 9, further comprising:

classifying the linked Ethernet transmission port as the uplink transmission port by the processing unit after receiving the DHCP offer message; and classifying the linked Ethernet transmission port as the downlink transmission port by the processing unit if the DHCP offer message is not received within a specified time interval.

12. The controlling method according to claim 9, wherein the network device further comprises a wireless transmission interface coupled to the processing unit, and the controlling method further comprises:

enabling a downlink transmission of the wireless transmission interface by the processing unit after classifying the linked Ethernet transmission port as the uplink transmission port.

13. The controlling method according to claim 12, further comprising:

disabling the downlink transmission of the wireless transmission interface by the processing unit after detecting that the connection between the Ethernet transmission port classified as the uplink transmission port and the network is interrupted.

14. The controlling method according to claim 12, wherein the wireless transmission interface is a Wi-Fi transmission interface and the network device is a repeater applicable for mesh networks, the network device is a repeater applicable for mesh networks.

15. The controlling method according to claim 9, further comprising:

temporarily blocking all existing uplink transmission before sending out the DHCP discover message;

classifying the linked Ethernet transmission port as the uplink transmission port and disconnecting all existing wireless uplink transmission after receiving the DHCP offer message; and classifying the linked Ethernet transmission port as the downlink transmission port and un-blocking all existing uplink transmission if the DHCP offer message is not received within a specified time interval.

16. A network device comprising:

an Ethernet transmission interface provided with at least one Ethernet transmission port; and a processing unit, coupled to the Ethernet transmission interface and configured to:
send out a dynamic host configuration protocol (DHCP) discover message through a linked Ethernet transmission port in response to linking one of the at least one Ethernet transmission port to a network and determine whether a DHCP offer message is received;
determine whether to prohibit data transmission of the linked Ethernet transmission port according to whether the DHCP discover message returned through a packet looping is detected; and
classify the linked Ethernet transmission port as an uplink transmission port or a downlink transmission port according to whether the DHCP offer message is received.

17. The network device according to claim 16, wherein the processing unit is further configured to:
prohibit data transmission of the linked Ethernet transmission port after detecting the DHCP discover message returned through the packet looping.

18. The network device according to claim 16, wherein the processing unit is further configured to:
classify the linked Ethernet transmission port as the uplink transmission port after receiving the DHCP offer message; and
classify the linked Ethernet transmission port as the downlink transmission port if the DHCP offer message is not received within a specified time interval.

19. The network device according to claim 16, further comprising:
a wireless transmission interface coupled to the processing unit;
wherein the processing unit is further configured to enable a downlink transmission of the wireless transmission interface after classifying the linked Ethernet transmission port as the uplink transmission port.

20. The network device according to claim 19, wherein the processing unit is further configured to:
disable the downlink transmission of the wireless transmission interface after detecting that the connection between the Ethernet transmission port classified as the uplink transmission port and the network is interrupted.

* * * * *